US012663565B2

(12) United States Patent
Wu et al.

(10) Patent No.: US 12,663,565 B2
(45) Date of Patent: Jun. 23, 2026

(54) DISPLAY DEVICE

(71) Applicant: Ningbo Sunny Automotive Optech Co., Ltd, Ningbo City (CN)

(72) Inventors: Shangliang Wu, Ningbo City (CN); Junyi Chen, Ningbo City (CN); Qiansen Xie, Ningbo City (CN)

(73) Assignee: Ningbo Sunny Automotive Optech Co., Ltd, Ningbo City (CN)

( * ) Notice: Subject to any disclaimer, the term of this patent is extended or adjusted under 35 U.S.C. 154(b) by 849 days.

(21) Appl. No.: 17/947,572

(22) Filed: Sep. 19, 2022

(65) Prior Publication Data

US 2023/0113671 A1    Apr. 13, 2023

Related U.S. Application Data

(63) Continuation of application No. PCT/CN2021/081407, filed on Mar. 18, 2021.

(30) Foreign Application Priority Data

Mar. 19, 2020    (CN) .......................... 202010195488.3

(51) Int. Cl.
*G02B 5/02*        (2006.01)
(52) U.S. Cl.
CPC .................................. *G02B 5/0215* (2013.01)
(58) Field of Classification Search
CPC .. G02B 5/0215; G02B 5/0257; G02B 5/0278; G02B 5/021; G02B 5/0231; G02B 5/02
See application file for complete search history.

(56) References Cited

U.S. PATENT DOCUMENTS

2005/0275952 A1*  12/2005  Odagiri .................. G03B 21/56
                                                            359/707
2006/0291065 A1*  12/2006  Hasei ................... G02B 6/0053
                                                            359/619

(Continued)

FOREIGN PATENT DOCUMENTS

CN              1734290 A       2/2006
CN              1892260 A       1/2007

(Continued)

OTHER PUBLICATIONS

Chinese Office Action for 202010195488.3, dated Jun. 18, 2021.
International Search Report for PCT/CN2021/081407, dated Jun. 17, 2021.

*Primary Examiner* — William R Alexander
*Assistant Examiner* — Gabriel A Sanz
(74) *Attorney, Agent, or Firm* — Sughrue Mion, PLLC

(57)        ABSTRACT

Provided is a display device, which includes: a diffusion plate, where the diffusion plate includes: a substrate including a first surface and a second surface facing away from each other; and a micro-structure unit located on a side of the second surface of the substrate, where the micro-structure unit includes a third surface and a fourth surface facing away from each other, the third surface is connected to the second surface, and the fourth surface has a surface shape axis inclined relative to the first surface; and a light source located on a side of the first surface of the substrate, where the light source is configured to emit a light beam to be diffused to the micro-structure unit, and the light beam to be diffused passes through the micro-structure unit to form a diffused light field.

19 Claims, 7 Drawing Sheets

(56)                    References Cited

U.S. PATENT DOCUMENTS

| | | | | |
|---|---|---|---|---|
| 2008/0074892 A1* | 3/2008 | Chuang | ............... | G02B 5/0278 |
| | | | | 362/355 |
| 2008/0117507 A1* | 5/2008 | Olczak | ............. | G02F 1/133606 |
| | | | | 359/456 |
| 2009/0096937 A1* | 4/2009 | Bauer | ...................... | B60R 1/12 |
| | | | | 348/739 |
| 2013/0050655 A1* | 2/2013 | Fujikawa | ........... | G02B 27/0101 |
| | | | | 353/38 |
| 2013/0127922 A1 | 5/2013 | Poliakov et al. | | |
| 2016/0013449 A1* | 1/2016 | Cui | ...................... | H10K 50/858 |
| | | | | 257/40 |
| 2016/0178913 A1 | 6/2016 | Endoh | | |
| 2019/0146237 A1* | 5/2019 | Uchida | ............... | G02B 5/0278 |
| | | | | 359/599 |
| 2020/0284952 A1* | 9/2020 | Uchida | ............... | G02B 5/0221 |
| 2021/0063736 A1* | 3/2021 | Saji | ........................ | G02B 27/01 |

FOREIGN PATENT DOCUMENTS

| | | | |
|---|---|---|---|
| CN | 101457901 A | 6/2009 |
| CN | 101995595 A | 3/2011 |
| CN | 103728676 A | 4/2014 |
| CN | 106170720 A | 11/2016 |
| CN | 106716185 A | 5/2017 |
| CN | 109154681 A | 1/2019 |
| CN | 109791232 A | 5/2019 |
| CN | 111221062 A | 6/2020 |

* cited by examiner 112 122B 123A 122A 120 122
110 111

122
100

DISPLAY DEVICE

CROSS-REFERENCE TO RELATED APPLICATIONS

This application is a Continuation of International Application No. PCT/CN2021/081407 filed on Mar. 18, 2021, which claims priority to Chinese Patent Application No. 202010195488.3, filed on Mar. 19, 2020, the entire disclosures of which are hereby incorporated by reference.

TECHNICAL FIELD

The present disclosure relates to the field of optical devices, and more particularly, to a display device.

BACKGROUND

In many fields, text information and image information are presented by a display device. The display device also includes a variety of different structural forms according to different usage requirements, such as display mode, installation space, and the like.

The diffusion plate is an optical element widely applied, for example, in a screen of a device such as a liquid crystal display, an LED lighting lamp, a head-up display system, and a projector. The main function of the diffusion plate is to sufficiently scatter incident light, thereby achieving a softer and more uniform illuminating effect. In order to realize the function of the diffusion plate, an inorganic or organic light diffuser may be added to the base material of the diffusion plate when the diffusion plate is manufactured; or micro-structures, such as ground glass surfaces, micro-lens arrays, are made on the surface of the diffusion plate. As the light passes through the diffusion plate, refraction, reflection, and scattering in different directions occur, thereby changing the travel path of the light and achieving the effect of optical diffusion.

The light-emitting surface of the conventional diffusion plate is generally perpendicular to the viewing direction. When the structure of the display device is limited or the use scenario is limited, and the light-emitting surface of the diffusion plate is at a certain angle with the viewing direction, the center of the diffused light field is greatly shifted, and the uniformity of the diffused light field is reduced, thereby deteriorating the display effect. There is a need in the art for a display device that still has a good display effect when the installation space is limited.

SUMMARY

An embodiment of the present disclosure provides a display device including a diffusion plate, where the diffusion plate includes: a substrate including a first surface and a second surface facing away from each other; and a micro-structure unit located on a side of the second surface of the substrate, where the micro-structure unit includes a third surface and a fourth surface facing away from each other, the third surface is connected to the second surface, and the fourth surface has a surface shape axis inclined relative to the first surface; and a light source located on a side of the first surface of the substrate, where the light source is configured to emit a light beam to be diffused to the micro-structure unit, the light beam to be diffused has a chief ray inclined relative to the first surface, the light beam to be diffused passes through the micro-structure unit to form a diffused light field, and a center of the diffused light field is located on the chief ray.

In an embodiment, a surface shape of the fourth surface is rotationally symmetrical relative to the surface shape axis.

In an embodiment, at the second surface, there are a first direction and a second direction perpendicular to each other, micro-structure units are arranged in the first direction and the second direction respectively, and adjacent micro-structure units are adhered to each other.

In an embodiment, heights of the micro-structure units are equal relative to the first surface of the substrate.

In an embodiment, heights of the micro-structure units are not equal relative to the first surface of the substrate.

In an embodiment, the third surface of the micro-structure unit is rectangular.

In an embodiment, a distance a in a first direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, satisfies $66 \ \mu m < a < 70 \ \mu m$; a distance b in a second direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, satisfies $32 \ \mu m < b < 36 \ \mu m$.

In an embodiment, a surface shape of the fourth surface is a quadratic or free-form surface.

In an embodiment, a surface shape of the fourth surface is a rotationally symmetric aspheric surface.

In an embodiment, a curvature coefficient of the surface shape of the fourth surface at the surface shape axis of the fourth surface is $0.05 \ \mu m^{-1}$ and a conical coefficient of the surface shape of the fourth surface is $-1.68$; a distance a in the first direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, is $68 \ \mu m$; a distance b in the second direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, is $33 \ \mu m$.

In an embodiment, a curvature coefficient of the surface shape of the fourth surface at the surface shape axis of the fourth surface is $0.0362 \ \mu m^{-1}$ and a conical coefficient of the surface shape of the fourth surface is $-1.68$; a distance a in the first direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, is $68 \ \mu m$; a distance b in the second direction, from an intersection of a surface shape axis of a fourth surface of a micro-structure unit and the fourth surface of the micro-structure unit to an intersection of a surface shape axis of a fourth surface of an adjacent micro-structure unit and the fourth surface of the adjacent micro-structure unit, is $34.4 \ \mu m$.

In an embodiment, a material of the substrate is quartz glass, polymethyl methacrylate, or non-shadow glue.

In an embodiment, a material of the micro-structure unit is quartz glass, polymethyl methacrylate, or non-shadow glue.

In an embodiment, a uniformity of the diffused light field is greater than 90%.

In an embodiment, a ratio of a sinusoidal value of an inclined angle θ between the chief ray and a normal of the first surface to a sinusoidal value of an inclined angle α between the surface shape axis and the normal of the first surface is equal to a value of a refractive index n of a material of the micro-structure unit.

In an embodiment, the inclined angle θ between the chief ray and the normal of the first surface satisfies θ≤40°.

In an embodiment, one of two adjacent micro-structure units is provided with an overlapping portion overlapping a fourth surface of another micro-structure unit.

In an embodiment, the inclined angle between the surface shape axis and the normal of the first surface ranges from 10° to 20°.

In an embodiment, an inclined angle between the normal of the first surface of the diffusion plate and the chief ray is 27°, and an inclined angle between the surface shape axis of the fourth surface and the normal of the first surface is 17.7°.

In an embodiment, an inclined angle between the normal of the first surface of the diffusion plate and the chief ray is 15°, and an inclined angle between the surface shape axis of the fourth surface and the normal of the first surface is 10°.

BRIEF DESCRIPTION OF THE DRAWINGS

Other features, objectives and advantages of the present disclosure will become more apparent upon reading the detailed description of non-limiting embodiment with reference to the following accompanying drawings.

DETAILED DESCRIPTION OF EMBODIMENTS

Figure 1:
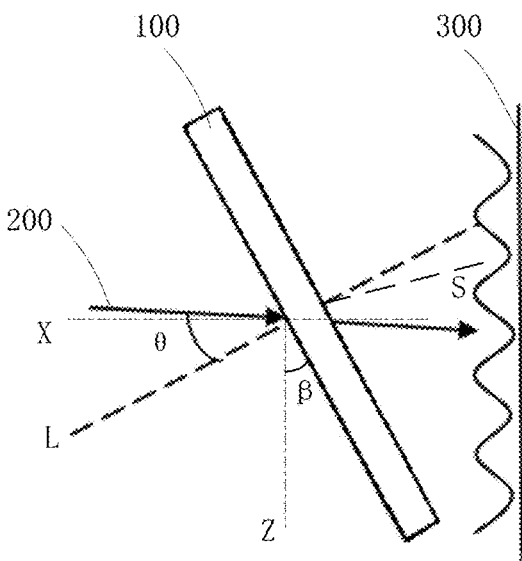
FIG. 1 shows a schematic structure diagram of a display device according to an embodiment of the present disclosure.

For a better understanding of the present disclosure, various aspects of the present disclosure will be described in more detail with reference to the accompanying drawings. It should be understood that the detailed description is merely an illustration for the exemplary implementations of the present disclosure, rather than a limitation to the scope of the present disclosure in any way. Throughout the specification, the same reference numerals designate the same elements. The expression "and/or" includes any and all combinations of one or more of the associated listed items.

It should be noted that, in the specification, the expressions such as "first," "second" and "third" are only used to distinguish one feature from another, rather than represent any limitations to the features. Thus, the first surface discussed below may also be referred to as the second surface without departing from the teachings of the present disclosure and vice versa.

In the accompanying drawings, the thicknesses, sizes and shapes of lenses are slightly adjusted for the convenience of explanation. The accompanying drawings are merely illustrative and are not strictly scaled. For example, the thickness of the substrate and the thickness of the micro-structure unit are not proportional to that in actual production. As used herein, the terms "approximately," "about," and other similar terms are used as terms of table approximation, rather than terms of scale, and are intended to describe inherent deviations in measurements or calculations that will be recognized by one of ordinary skill in the art.

It should be further understood that the terms "comprising," "including," "having," "contain" and/or "containing," when used in the specification, specify the presence of stated features, elements and/or components, but do not exclude the presence or addition of one or more other features, elements, components and/or combinations thereof. In addition, expressions such as "at least one of," when preceding a list of listed features, modify the entire list of features rather than an individual element in the list. Further, the use of "may," when describing the implementations of the present disclosure, relates to "one or more implementations of the present disclosure." Also, the term "exemplary" is intended to refer to an example or illustration.

Unless otherwise defined, all terms (including technical and scientific terms) used herein have the same meaning as commonly understood by those of ordinary skill in the art to which the present disclosure belongs. It should be further understood that terms (e.g., those defined in commonly used dictionaries) should be interpreted as having a meaning that is consistent with their meaning in the context of the relevant art and will not be interpreted in an idealized or overly formal sense unless expressly so defined herein.

It should be noted that embodiments in the present disclosure and the features in the embodiments may be combined with each other on a non-conflict basis. In addition, unless clearly defined or contradicted by the context, the specific steps included in the methods described in the present disclosure are not necessarily limited to the described order, but may be performed in any order or in parallel. Embodiments of the present disclosure will be described below in detail with reference to the accompanying drawings.

The diffusion plate provided by embodiments of the disclosure is suitable for inclined placement, has a good optical effect and a good uniformity of a diffused light field. The deviation between the center of the diffused light field and the light beam to be diffused is small. The display device provided in embodiments of the present disclosure is small in size, can be well adapted to different installation environments and use scenarios, and has good light diffusion performance. The center of the total diffused light field is on a center of the light rays emitted from the light source.

Referring to FIGS. 1 to 5, an embodiment of the present disclosure alternatively provides a display device including a light source (not shown) and a diffusion plate 100. A first surface 111 of the diffusion plate 100 is disposed toward the light source. The light source is used to emit light to the first surface of the diffusion plate 100, and the light emitted from the light source passes through the diffusion plate 100 to form an overall diffused light field.

Referring to FIGS. 4 to 8, an embodiment of the present disclosure provides a diffusion plate 100 including a substrate 110 and a micro-structure unit 120. The substrate 110 and the micro-structure unit 120 may be fixedly connected, or the substrate 110 and the micro-structure unit 120 may be integrally formed.

The substrate 110 includes a first surface 111 and a second surface 112 facing away from each other. The substrate 110 is usually a flat plate such that the first surface 111 and the second surface 112 are usually flat surfaces, respectively, and the first surface 111 and the second surface 112 are parallel. Alternatively, the first surface 111 and the second surface 112 may be provided in other shapes, such as an arc surface, a stepped surface, a corrugated surface, or a creased surface. Illustratively, the substrate 110 has a reference plane as an extension basis.

The micro-structure unit 120 is located on a side of the second surface 112 of the substrate 110, and includes a third surface 121 and a fourth surface 122 facing away from each other, where the third surface 121 is connected to the second surface 112. The side of the second surface 112 of the substrate 110 may be provided with a plurality of micro-structure units 120, which may cover the second surface of the substrate 110, or may cover only a portion thereof.

For each micro-structure unit 120, the light source emits a light beam to be diffused to the micro-structure unit 120, and the light beam to be diffused includes a chief ray 200. The light beam to be diffused enters the micro-structure unit 120 through the first surface 111 of the diffusion plate 100, and exits from the fourth surface after being diffused to form a diffused light field.

The first surface 111 is inclined relative to the light rays to be diffused. There is an inclined angle θ between the normal L of the first surface 111 and the chief ray 200. It should be appreciated that the inclined angle between the first surface 111 and a vertical plane of the chief ray 200 is also e. In FIG. 1, the diffusion plate 100 is inclined counterclockwise, and the surface shape axis S of the fourth surface 122 is inclined clockwise relative to the normal L.

Figure 10:
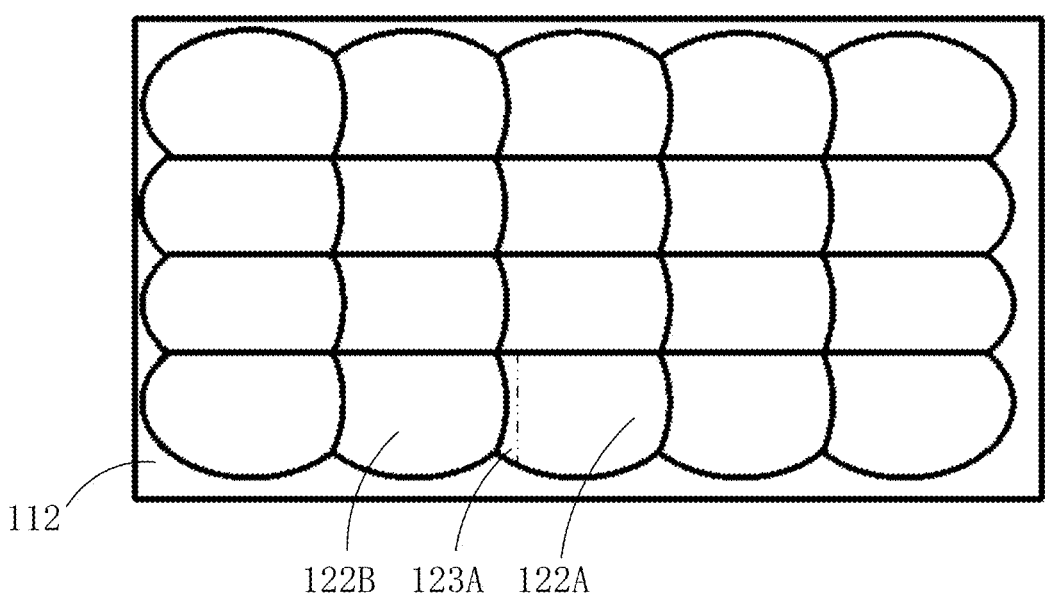
FIG. 10 shows a top view according to FIG. 9.

An inclined direction of the surface shape axis S of the fourth surface 120 is opposite to an inclined direction of the diffusion plate 100. Alternatively, as shown in FIG. 10, by setting the surface shape axis S of the fourth surface 120 to be inclined downward relative to the normal L of the first surface 111, and setting the chief ray 200 incident on the first surface 111 to be inclined upward relative to the normal L of the first surface 111, a center of the diffused light field diffused by the micro-structure unit 120 is in the direction of the chief ray 200.

The chief ray 200 emitted from the light source is inclined relative to the diffusion plate 100, which makes the display device provided in the present disclosure smaller in volume and more flexible in installation. The diffusion plate 100 can be appropriately adjusted to better fit the installation space and provide better diffusion performance. It should be appreciated that the upper and lower portions of the figures are not limited to the upper and lower portions in actual use.

Figure 5:
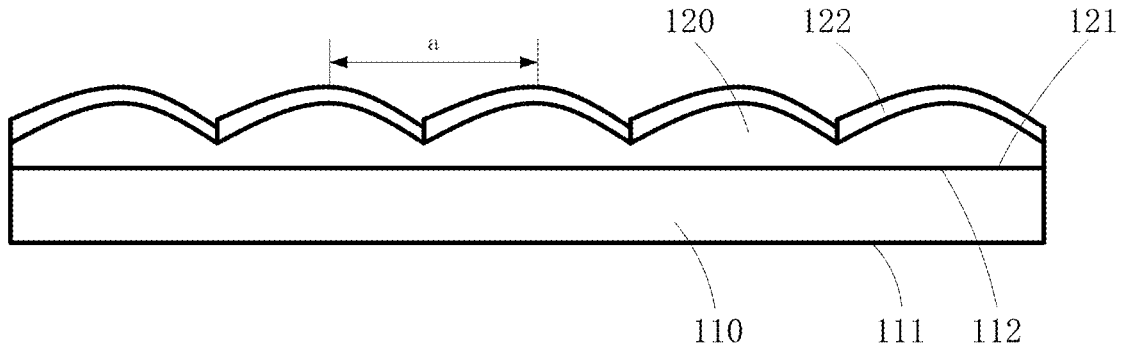
FIG. 5 shows a front view according to FIG. 4.
Figure 6:
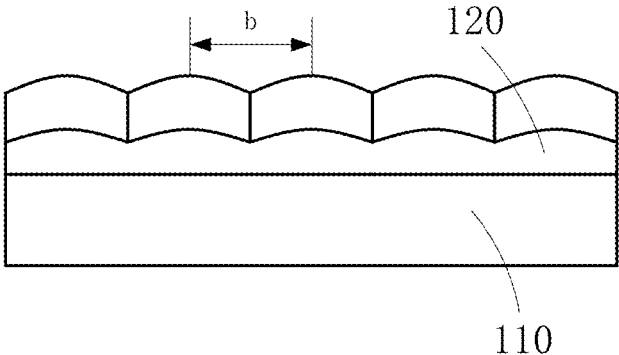
FIG. 6 shows a right view according to FIG. 5.
Figure 7:
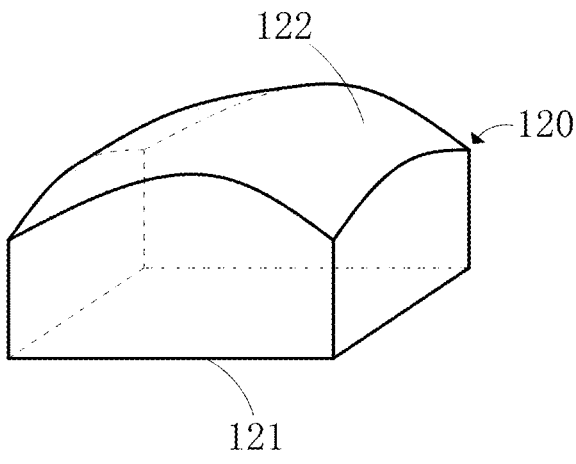
FIG. 7 shows a schematic structure diagram of a micro-structure unit according to an embodiment of the present disclosure.
Figure 8:
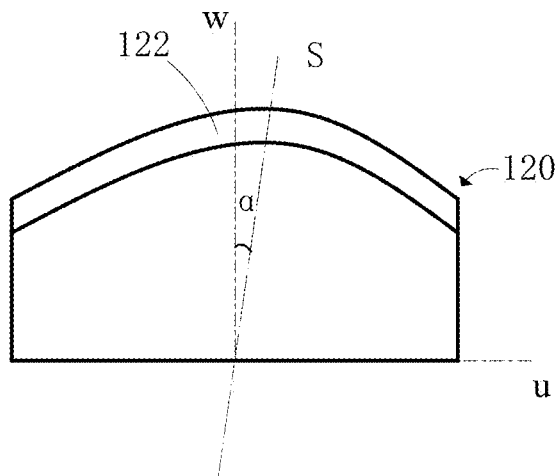
FIG. 8 shows a front view according to FIG. 7.

Referring to FIGS. 5, 7, and 8, with reference to the second surface 112 of the substrate 110, for example, taking a transverse direction in FIG. 5 as a u-axis and a vertical direction in FIG. 5 as a w-axis, a value of an inclined angle α of the surface shape axis S relative to the w-axis ranges from 10° to 20°, that is, the inclined angle between the surface shape axis S and the second surface 112 ranges from 70° to 80°.

According to the diffusion plate 100 provided in the present disclosure, the uniformity of the diffused light field formed after the light rays are diffused is good. In addition, the diffusion plate 100 provided in the present disclosure has a relatively compact structure, and occupies a relatively small installation space.

In an exemplary embodiment, at the second surface 112, there is a first direction and a second direction perpendicular to each other, and the micro-structure units 120 are arranged densely in the first direction and the second direction perpendicular to each other, respectively, that is, adjacent micro-structure units 120 are adhered to each other. The first direction may be the u-axis in FIG. 4 and the second direction may be the v-axis in FIG. 4. The micro-structure units 120 may alternatively be arranged in other ways, such as honeycomb, prism, etc. It may alternatively be arranged in annular, annularly arranged micro-structure units 120 are adapted to match incident rays having varying angles, such as incident rays of point light sources or scanning beams. The micro-structure units are arranged along u-axis and v-axis perpendicular to each other, so that each micro-structure unit 120 may better match a pixel array in an image.

In an exemplary embodiment, the third surface 121 of the micro-structure unit 120 is rectangular. The rectangular third surface 121 is easily densely arranged to cover the second surface 112, so that the light rays impinging on the first surface 111 substantially enter the micro-structure unit 120 from the second surface 112 after passing through the substrate 110, thereby making the diffused light rays more uniform and avoiding phenomena such as excessive local light rays. Moreover, a divergence angle may be better controlled, and local light concentration or loosening is avoided.

In an exemplary embodiment, heights of the micro-structure units 120 that are densely arranged are equal relative to the first surface 111 of the substrate 110. Referring to FIGS. 5 to 8, a height of the micro-structure unit 120 usually refers to a distance from an intersection of the surface shape axis S and the fourth surface 122 to a vertical line of the third surface 121. Referring to FIG. 8, a portion of the fourth surface 122 on the left side of the surface shape axis S may be higher than the height of the intersection of the surface shape axis S and the fourth surface 122, but when the inclined angles α of the surface shape axes S of micro-structure units 120 are the same, the distance from the intersection of the surface shape axis S and the fourth surface 122 to the vertical line of the third surface 121 is still regarded as the height of the micro-structure unit 120.

In an exemplary embodiment, in one direction at the second surface 112, for example, in the u-axis direction, the distance from the intersection of the surface shape axis S and the fourth surface 122 on a micro-structure unit 120 to the intersection of the surface shape axis S and the fourth surface 122 on the adjacent another micro-structure unit 120 is a, and distances a between every two adjacent micro-structure units 120 in the u-axis direction are equal. Similarly, in the v-axis direction, distances b between every two adjacent micro-structure units 120 may also be equal. Illustratively, sizes of the outermost micro-structure units 120 may be different.

In an exemplary embodiment, a surface shape of the fourth surface 122 of each of micro-structure units 120 that are densely arranged follows a same parameter formula. The surfaces of a same surface shape are easily manufactured in a uniform manner, so that the light rays at various locations of the diffusion plate 100 have a similar diffusion state, so as to avoid the difference in the light and dark state of the whole diffusion plate 100. Illustratively, when arrays of a plurality of micro-structure units 120 are provided on the side second surface 112 of the diffusion plate 100, the shapes of the fourth surfaces 122 of the micro-structure units 120 in each array are the same.

In an exemplary embodiment, the inclined angles α of the surface shape axes S of the fourth surfaces 122 of the micro-structure units 120 that are densely arranged are the same. The inclined angles α of the surface shape axes S are the same, which is used to make patterns of the diffused light rays uniform. Illustratively, the inclined directions of the surface shape axes S of the fourth surfaces 122 of the micro-structure units 120 are the same, so that the surface shape axes of the light rays diffused by the micro-structure units 120 that are densely arranged coincide, and it is advantageous to make the surface shape axes of the light rays coincide with the direction of the incident chief ray 200.

In an exemplary embodiment, for two adjacent micro-structure units 120, in the first direction, that is, in the u-axis direction, the distance a from the intersection of the surface shape axis S and the fourth surface 122 of a micro-structure unit 120 to the intersection of the surface shape axis S and the fourth surface 122 of the another adjacent micro-structure unit 120 satisfies 66 μm<a<70 μm.

Illustratively, in the second direction, that is, in the v-axis direction, the distance b from the intersection of the surface shape axis S and the fourth surface 122 of a micro-structure unit 120 to the intersection of the surface shape axis S and the fourth surface 122 of the adjacent another micro-structure unit 120 satisfies 32 μm<b<36 μm. By defining the distances between the micro-structure units 120, it is advantageous to constrain a size of the micro-structure units 120 and an arrangement density, and to allow sufficient diffusion of light rays corresponding to the micro-structure units 120, while allowing sufficient uniformity of the distribution of light rays transmitted by the second surface 112. Further, the diffusion plate 100 has a better diffusion performance.

In an exemplary embodiment, a surface shape of the fourth surface 122 is a quadratic or free-form surface.

In an exemplary embodiment, a surface shape of the fourth surface 122 is a rotationally symmetric aspheric surface. The formula of the fourth surface 122 may be expressed as follows:

$$z = \frac{cr^2}{1 + \sqrt{1 - (1+k)c^2 r^2}};$$ (1)

where c is a curvature coefficient of the fourth surface 122 at its intersection with the surface shape axis S, r is a vertical distance from a point on the fourth surface 122 to the surface shape axis S, k is a conical coefficient, and z is a distance from a point on the fourth surface 122 to the intersection of the fourth surface 122 and the surface shape axis S in a direction of the surface shape axis S. The light diffused by the fourth surface 122 whose surface shape satisfies this parameter is relatively uniform.

In an exemplary embodiment, a curvature coefficient c of a surface shape of the fourth surface 122 at the surface shape axis S of the fourth surface 122 is 0.05 $\mu m^{-1}$ and a conical coefficient k is −1.68; in the first direction, that is, in the u-axis direction, the distance a from the intersection of the surface shape axis S and the fourth surface 122 of a micro-structure unit 120 to the intersection of the surface shape axis S and the fourth surface 122 of the another adjacent micro-structure unit 120 is 68 μm. In the second direction, that is, in the v-axis direction, the distance b from the intersection of the surface shape axis S and the fourth surface 122 of a micro-structure unit 120 to the intersection of the surface shape axis S and the fourth surface 122 of the another adjacent micro-structure unit 120 is 33 μm. When the fourth surface 122 of the micro-structure unit 120 satisfies the surface shape, the light diffused by the diffusion plate 100 is more uniform.

In an exemplary embodiment, a curvature coefficient c of a surface shape of the fourth surface 122 at the surface shape axis S of the fourth surface 122 is 0.0362 $\mu m^{-1}$ and a conical coefficient k is −1.68; in the first direction, that is, in the u-axis direction, the distance a from the intersection of the surface shape axis S and the fourth surface 122 of a micro-structure unit 120 to the intersection of the surface shape axis S and the fourth surface 122 of the another adjacent micro-structure unit 120 is 68 μm. In the second direction, that is, in the v-axis direction, the distance b from the intersection of the surface shape axis S and the fourth surface 122 of a micro-structure unit 120 to the intersection of the surface shape axis S and the fourth surface 122 of the another adjacent micro-structure unit 120 is 34.4 μm. When the fourth surface 122 of the micro-structure unit 120 satisfies the surface shape, the light diffused by the diffusion plate 100 is more uniform.

In an exemplary embodiment, referring to FIG. 5, when a surface shape of the fourth surfaces 122 of the micro-structure unit 120 is a rotationally symmetrical aspheric surface, the surface shape axes S of the fourth surfaces 122 are inclined at the same angle along the same direction (u-axis), and the fourth surface 122 of each micro-structure unit 120 has the same height relative to the substrate 110, boundaries of two adjacent micro-structure units 120 are not at equal heights. Because the surface shape of the fourth surface 122 is usually asymmetric on both sides of the inclined direction. When the lowest points at four corners of the two adjacent micro-structure units 120 are aligned, there is a step difference at the boundary centers of the two adjacent micro-structure units 120. It will be appreciated that when the boundary centers of two adjacent micro-structure units 120 are aligned, the lowest points at the four corners of the two adjacent micro-structure units 120 have a step difference. When the lowest points at the four corners of the two micro-structure units 120 are at equal heights and the boundary centers are raised, manufacturing is more convenient.

Figure 9:
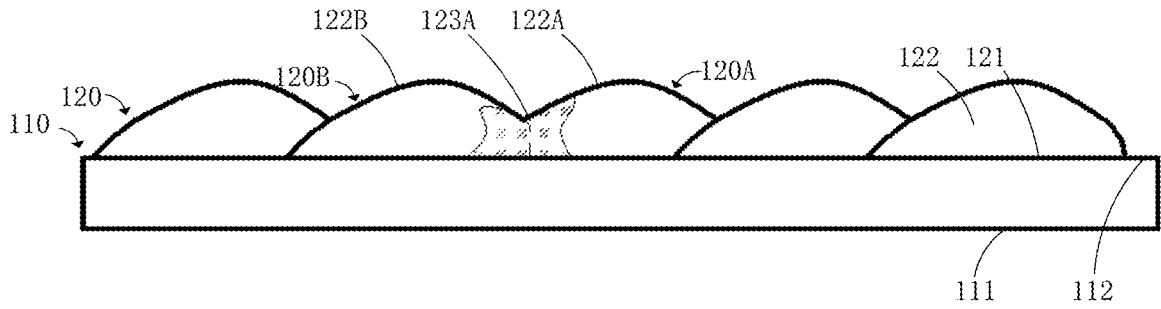
FIG. 9 shows a schematic front view of another diffusion plate according to an embodiment of the present disclosure.

In an exemplary embodiment, referring to FIGS. 9 and 10, in two adjacent micro-structure units 120, the first micro-structure unit 120A is provided with an overlapping portion 123A that overlaps the fourth surface 122B of the second micro-structure unit 120B. In fact, when the micro-structure units 120 are densely arranged, the adjacent micro-structure units 120 are usually integrally formed so that there is no solid boundary between the two adjacent micro-structure units 120. Illustratively, the third surface 121 of each micro-structure unit 120 is considered to be rectangular, and the first micro-structure unit 120A may be considered to be provided with an overlapping portion 123A overlapping the fourth surface 122B of the second micro-structure unit 120B. A top surface of the overlapping portion 123A is matched with the fourth surface 122A of the first micro-structure unit 120A, and is in uninterrupted contact with the fourth surface 122B of the second micro-structure unit 120B. With this arrangement, the light diffused by the densely arranged micro-structure units 120 as a whole is more uniform.

In fact, the third surface 121 of each micro-structure unit 120 may be considered to be a quadrilateral having an arc edge. Alternatively, it is considered that a transition unit is provided between the two micro-structured units, and one end of the transition unit facing away from the substrate 110 has two surfaces which are respectively matched with the fourth surfaces 122 of the two micro-structure units 120 on both sides. The two surfaces are connected without interruption. The densely arranged micro-structure units 120 are as a whole, so as to have a better surface consistency relative to the substrate 110.

Figure 11:
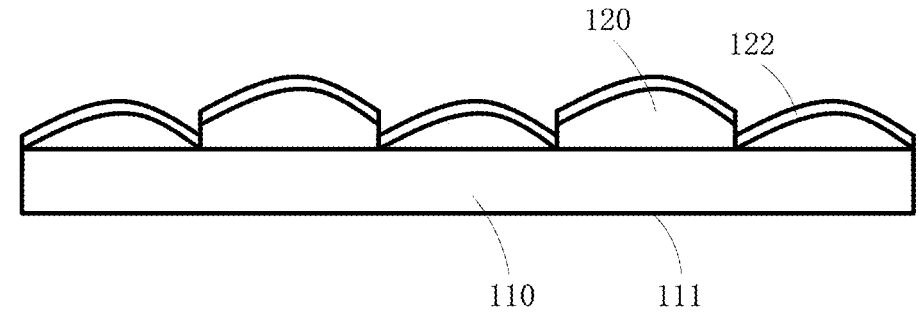
FIG. 11 shows a schematic front view of another diffusion plate according to an embodiment of the present disclosure.

In an exemplary embodiment, referring to FIG. 11, the adjacent micro-structure units 120 have different heights relative to the first surface 111 of the substrate 110 in the densely arranged micro-structure units 120. For example, the adjacent micro-structure units 120 may have the same height. Illustratively, the higher micro-structure unit 120 may alternatively include an overlap that covers a portion of the fourth surface 122 of the lower micro-structure unit 120.

In an exemplary embodiment, each micro-structure unit 120 has a different height relative to the first surface 111 of the substrate 110.

In an exemplary embodiment, a material of the substrate 110 is quartz glass, polymethyl methacrylate (PMMA) or non-shadow glue (photosensitive glue, UV glue).

In an exemplary embodiment, a material of the micro-structure unit 120 is quartz glass, polymethyl methacrylate, or non-shadow glue.

Illustratively, referring to FIG. 11, the material of the substrate 110 may be quartz glass, and the material of the micro-structure unit 120 may be non-shadow glue.

Figure 12:
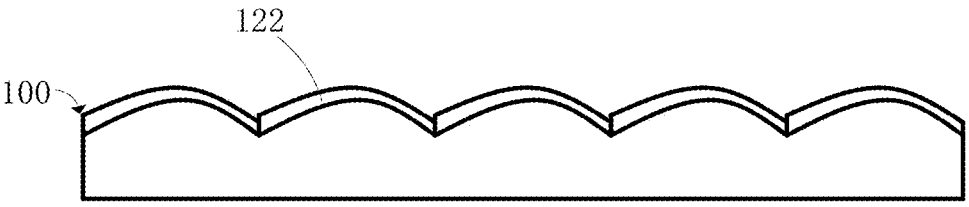
FIG. 12 shows a schematic front view of another diffusion plate according to an embodiment of the present disclosure.

Illustratively, referring to FIG. 12, the material of the diffusion plate 100 is PMMA. Illustratively, a fitting plane at the lowermost point of each fourth surface 122 may be used as an interface between the substrate 110 and the micro-structure unit 120.

Illustratively, the diffusion plate 100 of the present disclosure may be manufactured by the following method:

Firstly, spin-coating a certain thickness of photoresist on the surface of the substrate;

Then, making the micro-structure of the photoresist material by using gray-scale photolithography according to a gray-scale diagram of the micro-structure unit 120;

Electroforming the micro-structure of the photoresist material by an electroforming process to obtain a micro-structure master that can emboss;

Finally, using a roll-to-roll embossing process and the micro-structure master to emboss raw materials of the diffusion plate to obtain a diffusion plate of PMMA material or a diffusion plate of UV glue material.

In an exemplary embodiment, an inclined angle between the surface shape axis S of the fourth surface 122 and the normal of the first surface 111 is 17.7°, and an inclined angle between the normal of the first surface 111 of the diffusion plate 100 and the chief ray 200 is 27°.

In an exemplary embodiment, an inclined angle between the surface shape axis S of the fourth surface 122 and the normal of the first surface 111 is 10°, and an inclined angle between the normal of the first surface 111 of the diffusion plate 100 and the chief ray 200 is 15°.

Some specific embodiments are provided herein.

Example 1

Figure 2:
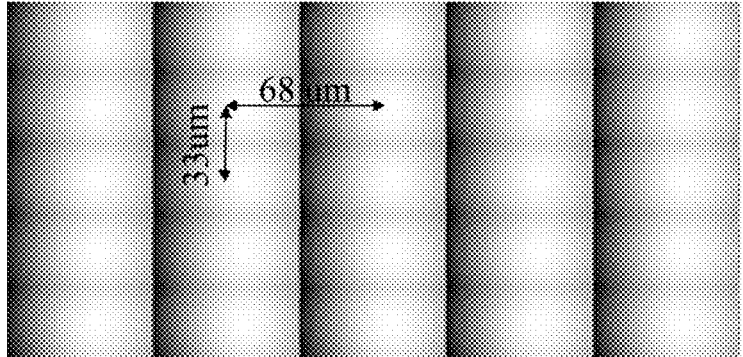
FIG. 2 shows a schematic grayscale diagram of a diffusion plate according to FIG. 1.
Figure 3:
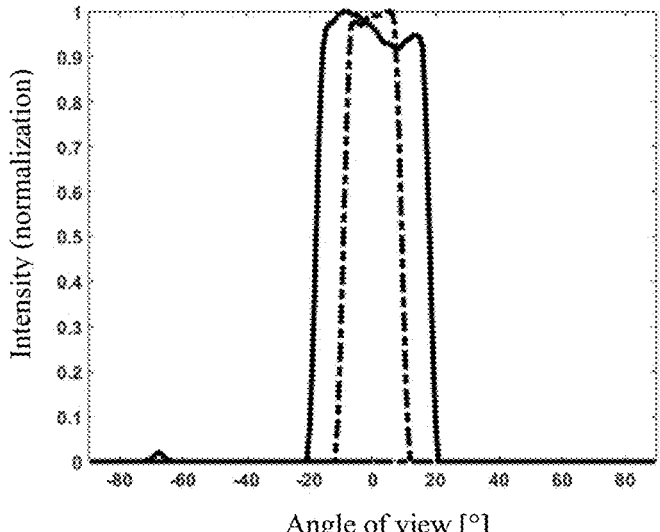
FIG. 3 shows a diffused light field diagram according to FIG. 1.
Figure 4:
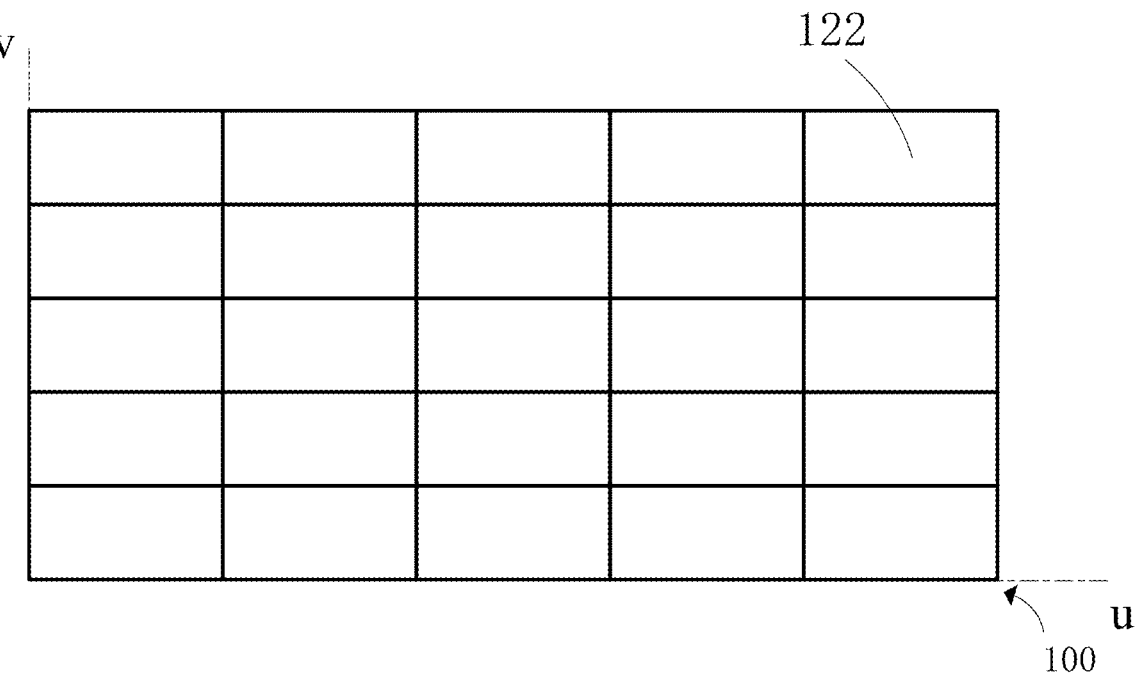
FIG. 4 shows a schematic top view of a diffusion plate according to an embodiment of the present disclosure.

Referring to FIGS. 1 to 3, X denotes the transverse direction and Z denotes the vertical direction. In the XZ plane, the inclined angle $\alpha$ between the surface shape axis S of the fourth surface 122 and the normal L of the first surface 111 is 17.7°. Specifically, the third surface 121 of the micro-structure unit 120 is rectangular. The micro-structure units 120 are densely arranged in a first direction and a second direction perpendicular to each other, respectively. The heights of the densely arranged micro-structure units 120 relative to the first surface 111 of the substrate 110 are equal.

The surface shape of the fourth surface 122 satisfies the conditional equation (1), where the curvature coefficient c satisfies $c=0.05 \ \mu m^{-1}$ and the conical coefficient satisfies $k=-1.68$; The distances a and b of the adjacent micro-structure units 120 after overlapping are 68 μm and 33 μm, respectively, and a vertical distance r of a point on the fourth surface 122 relative to the surface shape axis S satisfies $r=75.58 \ \mu m$. Each micro-structure unit 120 in the embodiment has a fourth surface 122 of a same surface shape. Alternatively, of course, the surface shapes of the fourth surfaces 122 may be different.

The chief ray 200 obliquely irradiates the first surface 111, and the inclined angle $\theta$ between the chief ray 200 and the normal L of the first surface 111 is 27°, and the chief ray 200 and the surface shape axis S of the fourth surface 122 are at both sides in the XZ plane relative to the normal L. The light emitted by the light source may be parallel rays or may have a certain divergence angle, and the light emitted by the light source may have a chief ray 200 in the propagation direction. The light emitted by the light source passes through the diffusion plate 100 to form an overall diffused light field. The center of the overall diffused light field is in the direction of the chief ray 200 of light emitted by the light source.

As can be seen with reference to FIG. 3, the uniformity of the diffused light field 300 is greater than 93% (calculated by the nine-point method). The solid line in FIG. 3 is the lateral (u-axis) divergence intensity of the diffused light field 300 in FIG. 2, the divergence angle is 36°, the dashed line is the longitudinal (v-axis) divergence intensity of the diffused light field 300 in FIG. 2, and the divergence angle is 18°.

The display device of the present embodiment occupies a relatively small installation space, has a relatively good uniformity of the diffused light field 300, and has a relatively good uniformity of the overall diffused light field. The center of the diffused light field 300 is in the direction of the chief ray 200, so that the deflections of the diffused light rays are preferably avoided.

In an exemplary embodiment, the diffusion plate 100 may be placed according to the needs of the use scenarios, and the directions of the chief rays 200 emitted by the light source may be adjusted. For example, as shown in FIG. 1, the diffusion plate 100 is inclined relative to the Z-axis, and the value of the inclined angle β is 17°.

Example 2

Figures 13, 14:
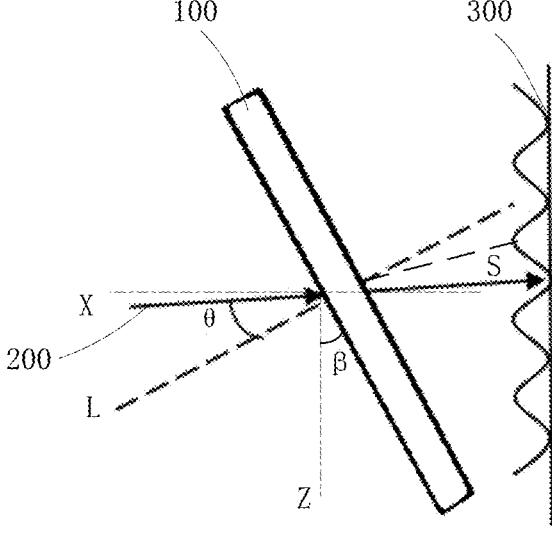
FIG. 13 is a schematic structure diagram of a display device according to an embodiment of the present disclosure.
FIG. 14 shows a schematic grayscale diagram of a diffusion plate according to FIG. 13.
Figure 15:
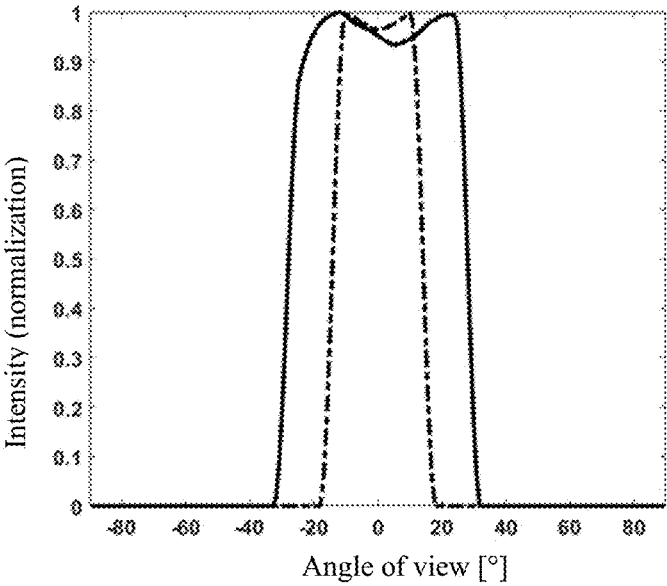
FIG. 15 shows a diffused light field diagram according to FIG. 13.

Referring to FIGS. 13 to 15, X denotes the transverse direction and Z denotes the vertical direction. In the XZ plane, the inclined angle α between the surface shape axis S of the fourth surface 122 and the normal L of the first surface 111 is 10°. Specifically, the third surface 121 of the micro-structure unit 120 is rectangular. The micro-structure units 120 are densely arranged in a first direction and a second direction perpendicular to each other, respectively. The heights of the densely arranged micro-structure units 120 relative to the first surface 111 of the substrate 110 are equal.

The surface shape of the fourth surface 122 satisfies the conditional equation (1), where the curvature coefficient c satisfies c=0.0362 μm⁻¹ and the conical coefficient satisfies k=−1.68; The distances a and b of the adjacent micro-structure units 120 after overlapping are 68 μm and 34.4 μm, respectively, and a vertical distance r of a point on the fourth surface 122 relative to the surface shape axis S satisfies r=76.2 μm. Alternatively, of course, the surface shapes of the fourth surfaces 122 may be different.

The chief ray 200 obliquely illuminates the first surface 111, and the inclined angle θ between the chief ray 200 and the normal L of the first surface 111 is 15°. After the diffused light beam passes through the diffusion plate 100, a diffused light field 300 is formed, and the center of the diffused light field 300 is located in the direction of the chief ray 200.

As can be seen with reference to FIG. 15, the uniformity of the diffused light field 300 is greater than 90% (calculated by the nine-point method). The solid line in FIG. 15 is the lateral (u-axis) divergence intensity of the diffused light field 300 in FIG. 14, the divergence angle is 56°, the dashed line is the longitudinal (v-axis) divergence intensity of the diffused light field 300 in FIG. 14, and the divergence angle is 28°.

The display device of the present embodiment occupies a relatively small installation space, and has a relatively good diffusivity of the total diffused light field. The center of the total diffused light field is in the direction of central light rays emitted by the light source, so that deflections of the light rays after being diffused is preferably avoided.

In an exemplary embodiment, the diffusion plate 100 may be placed according to the needs of the use scenarios, and the directions of the rays emitted by the light source may be adjusted. For example, as shown in FIG. 13, the diffusion plate 100 is inclined relative to the Z-axis, and the value of the inclined angle β is 17°.

Example 3

Figure 16:
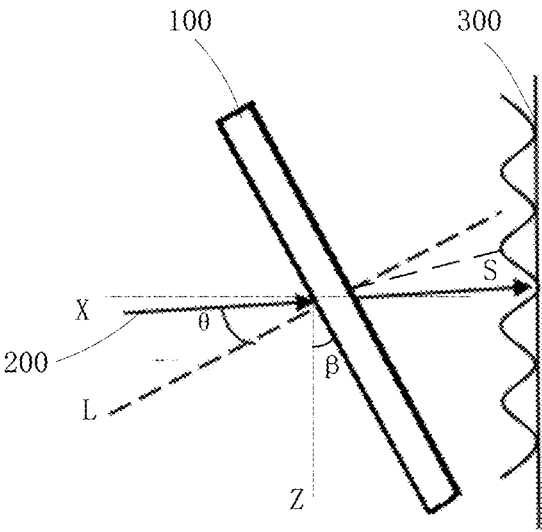
FIG. 16 is a schematic structure diagram of a display device according to an embodiment of the present disclosure.
Figure 17:
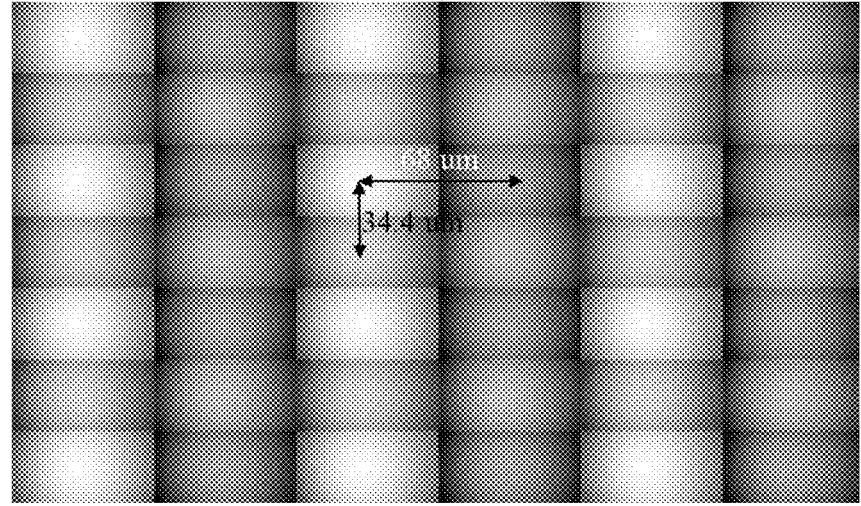
FIG. 17 shows a schematic grayscale diagram of a diffusion plate according to FIG. 16.
Figure 18:
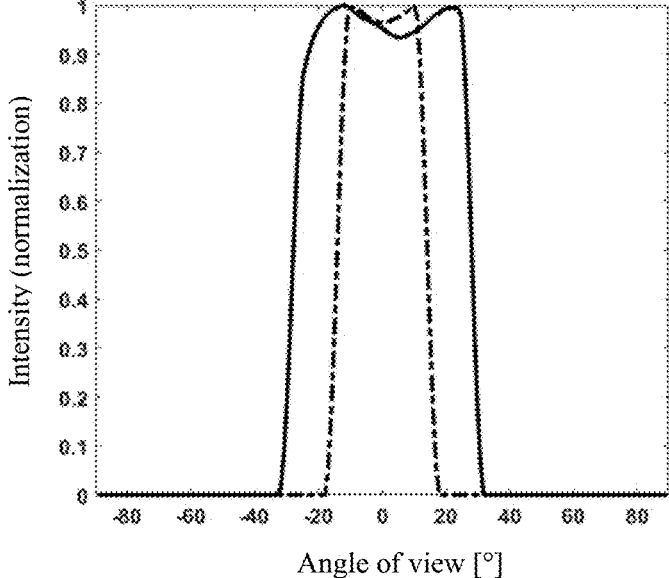
FIG. 18 shows a diagram of a diffused light field according to FIG. 16.

Referring to FIGS. 16 to 18, X denotes the transverse direction and Z denotes the vertical direction. In the XZ plane, the inclined angle α between the surface shape axis S of the fourth surface 122 and the normal L of the first surface 111 is 10°. Specifically, the third surface 121 of the micro-structure unit 120 is rectangular. The micro-structure units 120 are densely arranged in a first direction and a second direction perpendicular to each other, respectively. The heights of the densely arranged micro-structure units 120 relative to the first surface 111 of the substrate 110 are not equal. For example, in the first direction and the second direction, there are micro-structure units 120 spaced apart which are higher than the surroundings. Illustratively, the heights of the bottoms of the micro-structures are randomly generated by the rand function.

The surface shape of the fourth surface 122 satisfies the conditional equation (1), where the curvature coefficient c satisfies c=0.0362 μm⁻¹ and the conical coefficient satisfies k=−1.68; The distances a and b of the adjacent micro-structure units 120 after overlapping are 68 μm and 34.4 μm, respectively, and a vertical distance r of a point on the fourth surface 122 relative to the surface shape axis S satisfies r=76.2 μm.

The chief ray 200 obliquely irradiates the first surface 111. The inclined angle θ between the chief ray 200 and the normal L of the first surface 111 is 15°. After the diffused light beam passes through the diffusion plate 100, a diffused light field 300 is formed.

As can be seen with reference to FIG. 18, the uniformity of the diffused light field 300 is greater than 90% (calculated by the nine-point method). The solid line in FIG. 18 is the lateral (u-axis) divergence intensity of the diffused light field 300 in FIG. 17, the divergence angle is 56°, the dashed line is the longitudinal (v-axis) divergence intensity of the diffused light field 300 in FIG. 17, and the divergence angle is 28°.

The display device of the present embodiment occupies a relatively small installation space, has a relatively good uniformity of the diffused light field 300, and has a relatively good uniformity of the overall diffused light field. The center of the diffused light field 300 in the direction of the chief ray 200 to be diffused preferably avoids deflections of the diffused light rays.

In an exemplary embodiment, the diffusion plate 100 may be placed according to the needs of the use scenarios, and the directions of the chief rays 200 emitted by the light source may be adjusted. For example, as shown in FIG. 16, the diffusion plate 100 is inclined with respect to the Z-axis, and the value of the inclined angle β is 17°.

The foregoing is only a description for the preferred embodiments of the present disclosure and the applied technical principles. It should be appreciated by those of ordinary skill in the art that the inventive scope of the present disclosure is not limited to the technical solution formed by the particular combinations of the above technical features. The inventive scope should also cover other technical solutions formed by any combination of the above technical features or equivalent features thereof without departing from the concept of the invention, for example, technical solutions formed by replacing the features as disclosed in the present disclosure with (but not limited to) technical features with similar functions.

What is claimed is:

1. A display device, comprising:
   a diffusion plate, wherein the diffusion plate comprises:
   a substrate comprising a first surface and a second surface facing away from each other; and
   a micro-structure unit located on a side of the second surface of the substrate, wherein the micro-structure unit comprises a third surface and a fourth surface facing away from each other, the third surface is connected to the second surface, and the fourth surface has a surface shape axis inclined relative to the first surface; and
   a light source located on a side of the first surface of the substrate, wherein the light source is configured to emit a light beam to be diffused to the micro-structure unit, the light beam to be diffused has a chief ray inclined relative to the first surface and emitted from the light source at an original direction, and the light beam to be diffused passes through the micro-structure unit to form a diffused light field, wherein the chief ray is located at a center of the light beam to be diffused and maintains the original direction after passing through the micro-structure unit, and a center of the diffused light field is located on the chief ray; and wherein an inclined direction of the surface shape axis relative to the first surface is opposite to an inclined direction of the first surface relative to the chief ray, so that the light beam to be diffused passes through the micro-structure unit to form the diffused light field with the center of the diffused light field located on the chief ray, wherein the diffusion plate comprises a plurality of micro-structure units, and inclined surface shape axes of all micro-structure units on the second surface of the substrate have a given direction opposite to the inclined direction of the first surface relative to the chief ray.

2. The display device according to claim 1, wherein a surface shape of the fourth surface is rotationally symmetrical relative to the surface shape axis.

3. The display device according to claim 1, wherein at the second surface, there are a first direction and a second direction perpendicular to each other, micro-structure units are arranged in the first direction and the second direction respectively, and adjacent micro-structure units are adhered to each other.

4. The display device according to claim 3, wherein heights of the micro-structure units are equal relative to the first surface of the substrate.

5. The display device according to claim 3, wherein heights of the micro-structure units are not equal relative to the first surface of the substrate.

6. The display device according to claim 3, wherein the third surface of the micro-structure unit is rectangular.

7. The display device according to claim 3, wherein a distance a in the first direction, from an intersection of the surface shape axis of the fourth surface of the micro-structure unit and the fourth surface of the micro-structure unit to an intersection of a surface shape axis of a fourth surface of an adjacent micro-structure unit and the fourth surface of the adjacent micro-structure unit, satisfies 66 µm<a<70 µm; and a distance b in the second direction, from the intersection of the surface shape axis of the fourth surface of the micro-structure unit and the fourth surface of the micro-structure unit to an intersection of a surface shape axis of a fourth surface of an adjacent micro-structure unit and the fourth surface of the adjacent micro-structure unit, satisfies 32 µm<b<36 µm.

8. The display device according to claim 7, wherein a curvature coefficient of the surface shape of the fourth surface at the surface shape axis of the fourth surface is 0.05 µm−1 and a conical coefficient of the surface shape of the fourth surface is −1.68; the distance a in the first direction, from the intersection of the surface shape axis of the fourth surface of the micro-structure unit and the fourth surface of the micro-structure unit to the intersection of the surface shape axis of the fourth surface of the adjacent micro-structure unit and the fourth surface of the adjacent micro-structure unit, is 68 µm; the distance b in the second direction, from the intersection of the surface shape axis of the fourth surface of the micro-structure unit and the fourth surface of the micro-structure unit to the intersection of the surface shape axis of the fourth surface of the adjacent micro-structure unit and the fourth surface of the adjacent micro-structure unit, is 33 µm.

9. The display device according to claim 7, wherein a curvature coefficient of the surface shape of the fourth surface at the surface shape axis of the fourth surface is 0.0362 µm−1 and a conical coefficient of the surface shape of the fourth surface is −1.68; the distance a in the first direction, from the intersection of the surface shape axis of the fourth surface of the micro-structure unit and the fourth surface of the micro-structure unit to the intersection of the surface shape axis of the fourth surface of the adjacent micro-structure unit and the fourth surface of the adjacent micro-structure unit, is 68 µm; the distance b in the second direction, from the intersection of the surface shape axis of the fourth surface of the micro-structure unit and the fourth surface of the micro-structure unit to the intersection of the surface shape axis of the fourth surface of the adjacent micro-structure unit and the fourth surface of the adjacent micro-structure unit, is 34.4 µm.

10. The display device according to claim 1, wherein the fourth surface is a rotationally symmetric aspheric surface.

11. The display device according to claim 1, wherein a uniformity of the diffused light field is greater than 90%.

12. The display device according to claim 1, wherein a ratio of a sinusoidal value of an inclined angle θ between the chief ray and a normal of the first surface to a sinusoidal value of an inclined angle α between the surface shape axis and the normal of the first surface is equal to a value of a refractive index n of a material of the micro-structure unit.

13. The display device according to claim 12, wherein the inclined angle θ between the chief ray and the normal of the first surface satisfies θ≤40°.

14. The display device according to claim 12, wherein one of two adjacent micro-structure units is provided with an overlapping portion overlapping a fourth surface of another micro-structure unit.

15. The display device according to claim 12, wherein the inclined angle between the normal of the first surface of the diffusion plate and the chief ray is 27°, and the inclined angle between the surface shape axis of the fourth surface and the normal of the first surface is 17.7°.

16. The display device according to claim 12, wherein the inclined angle between the normal of the first surface of the diffusion plate and the chief ray is 15°, and the inclined angle between the surface shape axis of the fourth surface and the normal of the first surface is 10°.

17. The display device according to claim 1, wherein an inclined angle between the surface shape axis and a normal of the first surface ranges from 10° to 20°.

18. The display device according to claim 1, wherein a surface shape of the fourth surface is a quadratic or free-form surface.

19. The display device according to claim 1, wherein a material of the substrate is quartz glass, polymethyl methacrylate, or non-shadow glue.

* * * * *